(12) United States Patent
Chen (10) Patent No.: US 7,147,595 B1
(45) Date of Patent: Dec. 12, 2006

(54) CNC MACHINE TOOL

(76) Inventor: Hsi-Kuan Chen, No. 27, Tung-Hai St. Tung-Hai Tsun, Lung-Ching Hsiang, Taichung Hsien (TW)

( * ) Notice: Subject to any disclaimer, the term of this patent is extended or adjusted under 35 U.S.C. 154(b) by 0 days.

(21) Appl. No.: 11/301,954

(22) Filed: Dec. 13, 2005

(51) Int. Cl.
- *B23Q 3/157* (2006.01)
- *B23Q 1/56* (2006.01)
- *B23Q 11/00* (2006.01)
- *B23C 1/06* (2006.01)

(52) U.S. Cl. .......................... 483/14; 483/31; 483/36; 483/39; 483/41; 409/237; 409/235; 409/159; 408/235; 29/33 P (58) Field of Classification Search ................ 483/14, 483/30–31, 36, 39–41; 409/237, 235, 159, 409/172, 238; 408/235, 234; 29/33 P
See application file for complete search history.

(56) References Cited

U.S. PATENT DOCUMENTS

| | | | |
|---|---|---|---|
| 4,181,211 A | * | 1/1980 | Nishimura et al. ...... 198/346.1 |
| RE31,288 E | * | 6/1983 | Matsuzaki et al. .......... 29/27 C |
| 5,261,147 A | * | 11/1993 | Wood, III .................... 29/33 P |
| 6,364,818 B1 | * | 4/2002 | Chen ............................. 483/30 |
| 6,439,813 B1 | * | 8/2002 | Repossini ................... 409/235 |
| 6,519,823 B1 | * | 2/2003 | Sugata et al. ................. 29/26 A |
| 6,530,300 B1 | * | 3/2003 | Nakai et al. ................... 82/117 |
| 6,551,038 B1 | * | 4/2003 | Sugata et al. ............... 409/134 |
| 6,647,605 B1 | * | 11/2003 | Hiramoto et al. ........... 29/33 P |
| 6,652,204 B1 | * | 11/2003 | Stengele et al. ............ 409/235 |
| 6,811,361 B1 | * | 11/2004 | Sugata et al. ............... 409/134 |
| 6,843,624 B1 | * | 1/2005 | Sugata et al. ............... 409/235 |
| 7,013,544 B1 | * | 3/2006 | Yasuda et al. .............. 29/27 C |

FOREIGN PATENT DOCUMENTS

| | | | |
|---|---|---|---|
| JP | 2001-9652 A | * | 1/2001 |
| JP | 2001-315040 A | * | 11/2001 |
| JP | 2002-205241 A | * | 7/2002 |

* cited by examiner

*Primary Examiner*—Erica Cadugan
(74) *Attorney, Agent, or Firm*—Curatolo Sidoti Co. LPA; Joseph G. Curatolo (57) ABSTRACT

A CNC machine tool includes a worktable supporting two workpieces and rotatable on a base so as to exchange the positions of the workpieces. A post member is fixed on the base. A first horizontal rail unit is movable vertically on the post member. A second horizontal rail unit is movable on the first horizontal rail unit along a first horizontal direction. A spindle head unit is movable on the second horizontal rail unit along a second horizontal direction perpendicular to the first horizontal direction.

5 Claims, 11 Drawing Sheets

CNC MACHINE TOOL

BACKGROUND OF THE INVENTION

1. Field of the Invention

This invention relates to a machine tool, and more particularly to a CNC (Computer-Numerical-Controlled) machine tool.

2. Description of the Related Art

Figure 1:
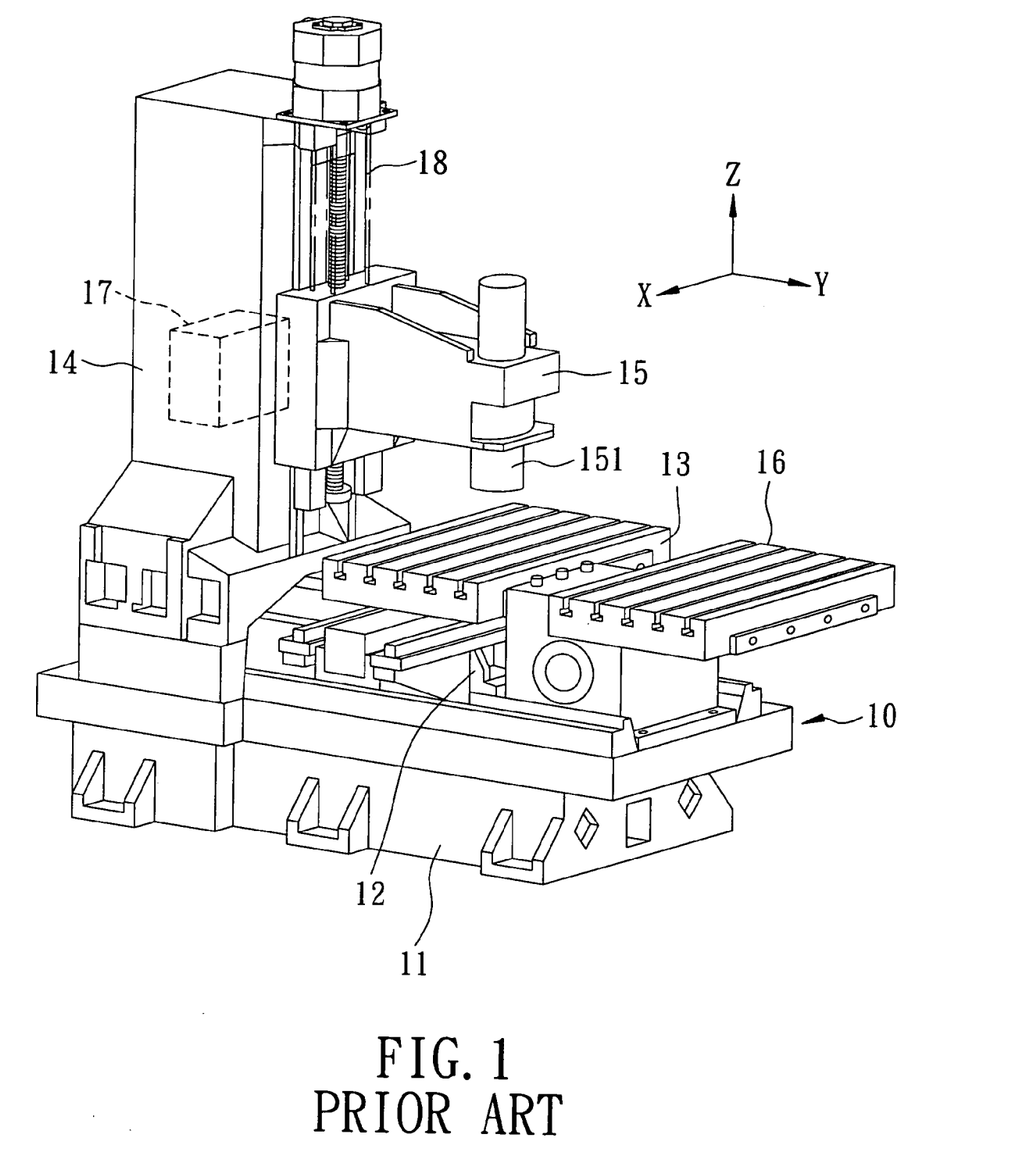
FIG. 1 is a perspective view of a conventional CNC machine tool.

Referring to FIG. 1, a conventional CNC machine tool 10 includes a base 11, a sliding seat 12 movable on a front portion of the base 11 along a first horizontal direction (Y), a main worktable 13 movable on the sliding seat 12 along a second horizontal direction (X) perpendicular to the first horizontal direction (Y), a post 14 fixed on a rear portion of the base 11, and a spindle seat 15 movable on the post 14 along a vertical axis (Z). The spindle seat 15 is provided with a spindle 151 for mounting a cutter (not shown). A first workpiece (not shown) is held on the main worktable 13 for machining. An auxiliary worktable 16 is disposed movably on the base 11 for supporting a second workpiece (not shown). After the machining of the first workpiece on the main worktable 13 is completed, the auxiliary worktable 16 is moved to abut against the main worktable 13 so as to allow for exchange of the positions of the first and second workpieces, thereby preparing for machining of the second workpiece. Subsequently, the auxiliary worktable 16 is moved away from the main worktable 13. This allows for removal of the first workpiece from the CNC machine tool. A drawback of the CNC machine tool 100 is that, when the main and auxiliary worktables 13, 16 are spaced apart from each other, machining chips or other objects may jump or fly into a space between the main and auxiliary worktables 13, 16. As a result, the main and auxiliary worktables 13, 15 may be unable to abut against each other. If this occurs, it is not possible to move the second workpiece accurately to a predetermined position for machining, thereby reducing machining precision.

Figure 2:
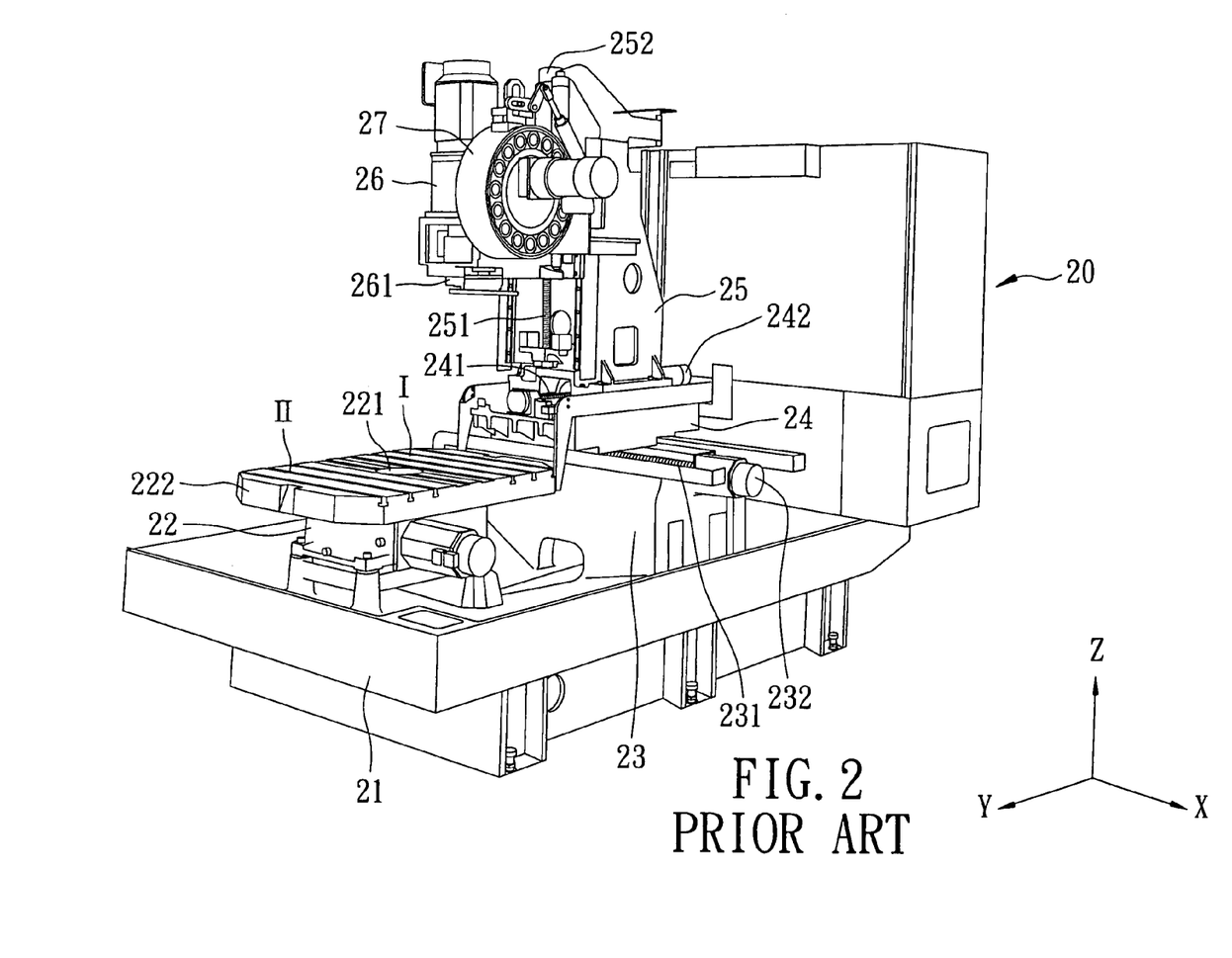
FIG. 2 is a perspective view of another conventional CNC machine tool.
Figure 3:
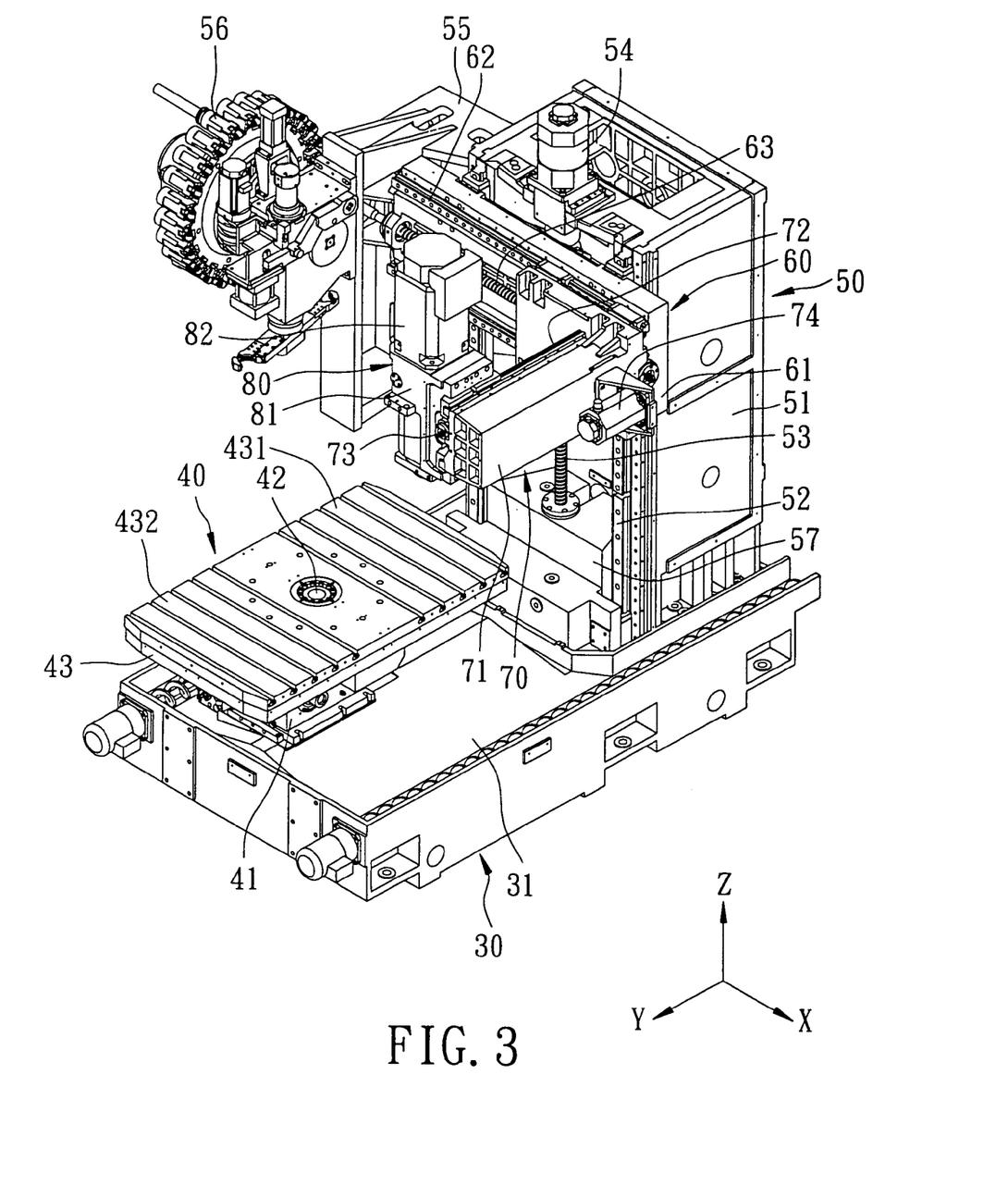
FIG. 3 is an assembled perspective view of the preferred embodiment of a CNC machine tool according to this invention.
Figure 4:
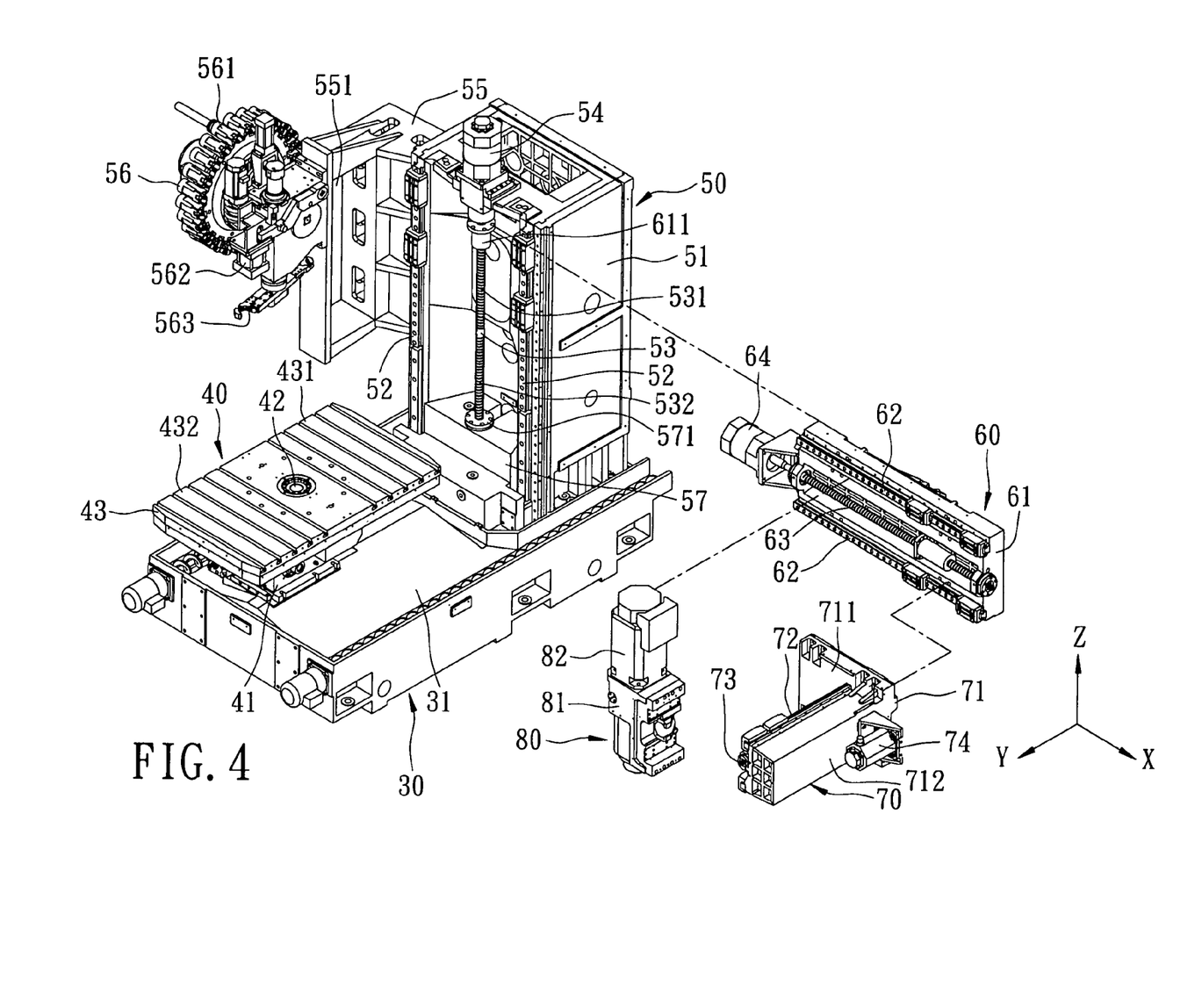
FIG. 4 is a partly exploded perspective view of the preferred embodiment.
Figure 5:
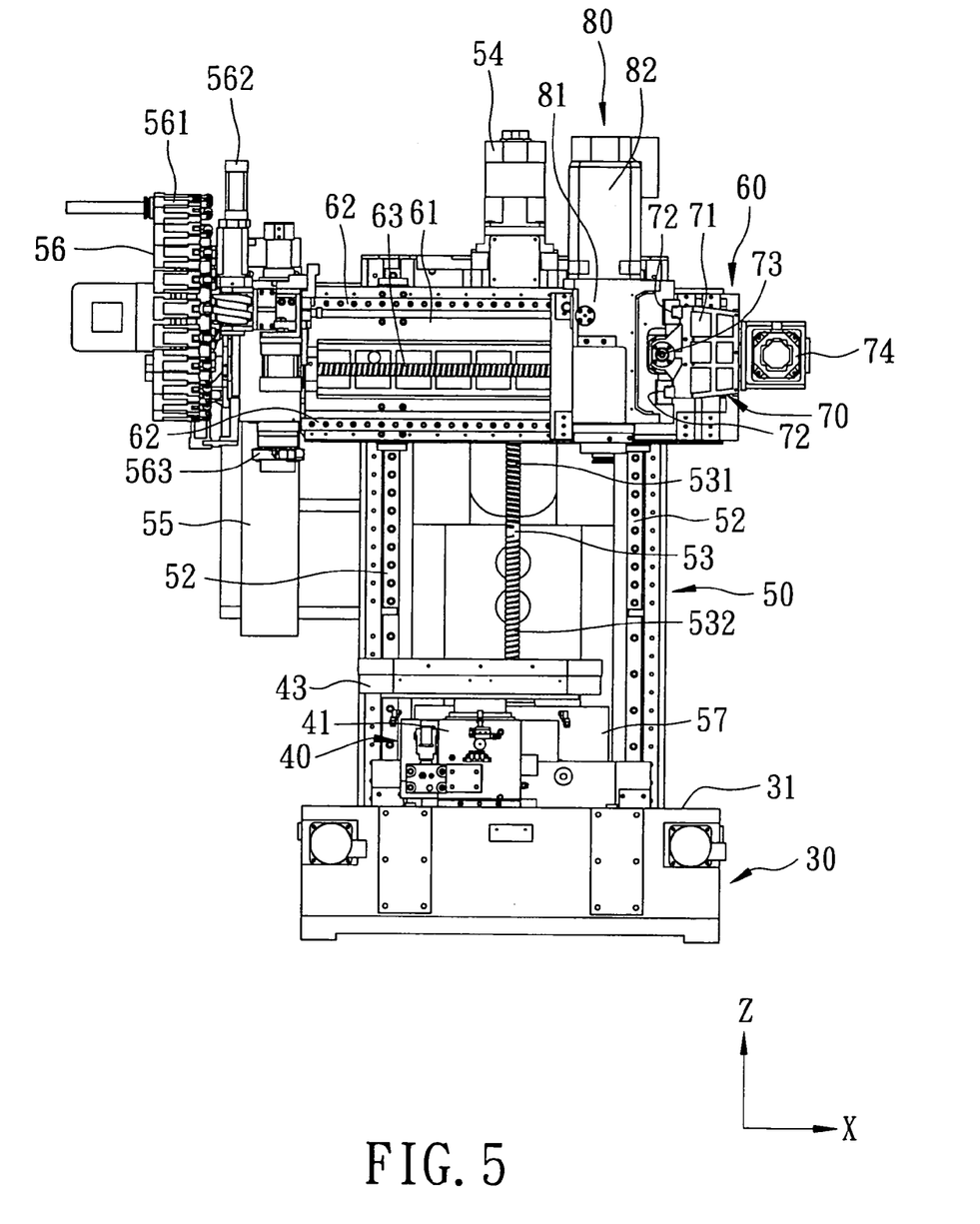
FIG. 5 is a front view of the preferred embodiment.
Figure 6:
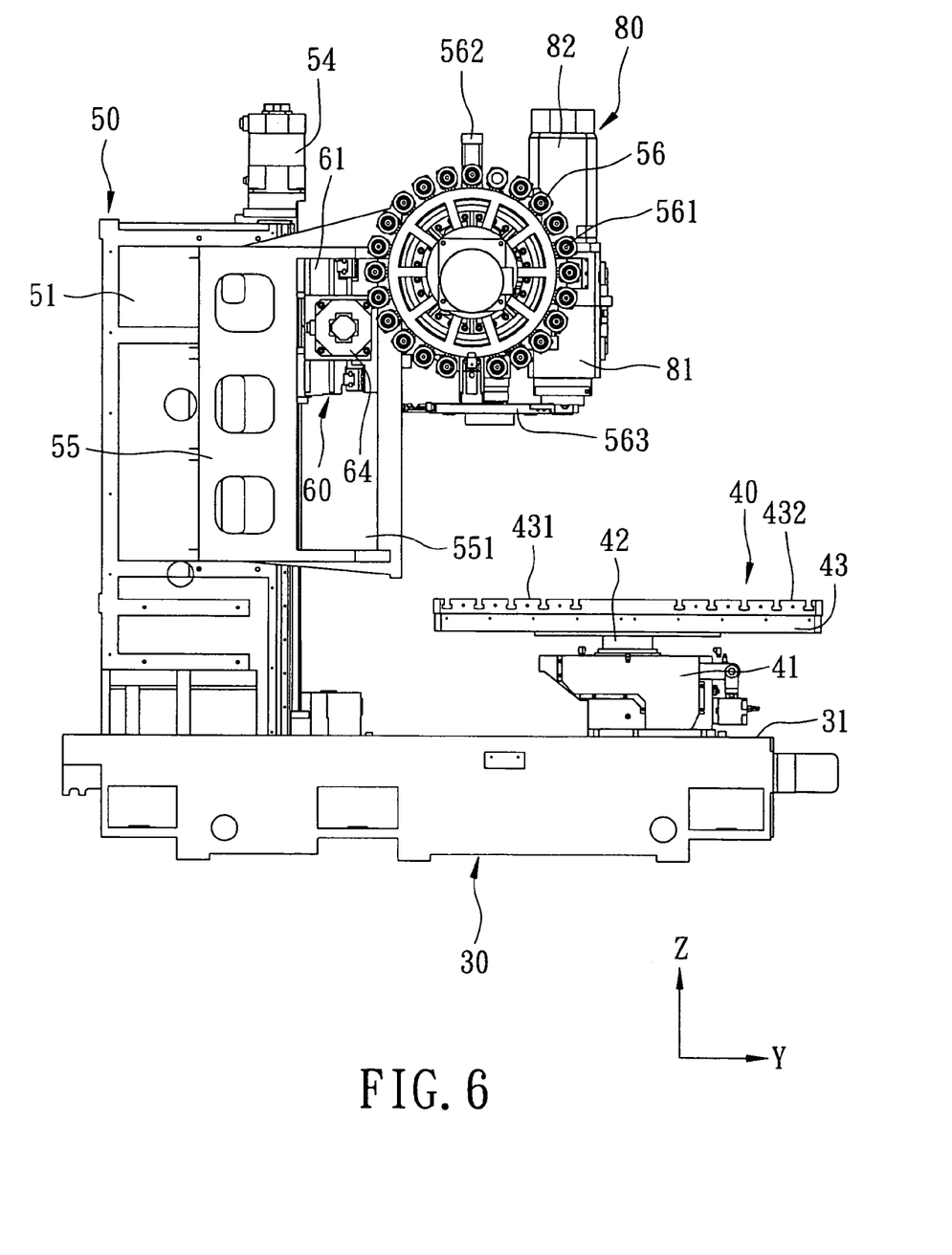
FIG. 6 is a side view of the preferred embodiment.

Referring to FIG. 2, another conventional CNC machine tool 20 includes a base 21, a rotatable worktable 22 disposed on a front portion of the base 21, a sliding rail unit 23 disposed fixedly on a rear portion of the base 21, a sliding seat 24 movable on the sliding rail unit 23 along a first horizontal direction (X), a movable post 25 movable on the sliding seat 24 along a second horizontal direction (Y) perpendicular to the first horizontal direction (X), a spindle seat 26 movable on the post 25 along a vertical axis (Z), and a cutter-storing bin 27 disposed on the spindle seat 26. The sliding seat 24 is driven by an X-axis threaded rod 231 and an X-axis servomotor 232 to move on the sliding rail unit 23. The post 25 is driven by a Y-axis threaded rod 241 and a Y-axis servomotor 242 to move on the sling seat 24. The spindle seat 26 is driven by a Z-axis threaded rod 251 and a Z-axis servomotor 252 to move on the post 25. The spindle seat 26 has a lower end that is provided with a spindle 261 for mounting a cutter (not shown). The rotatable worktable 22 includes a vertical rotating shaft 221 journalled on the base 21, and a horizontal support plate 222 disposed fixedly on an upper end of the rotating shaft 221. The support plate 222 has front and rear mounting portions (I, II) each adapted for mounting a workpiece (not shown) thereon. The cutter can machine the workpiece on the first mounting portion (I). After the machining of the workpiece is completed, the worktable 22 is rotated 180 degrees so as to exchange the positions of the two workpieces relative to the base 21, thus allowing for discharge of the machined workpiece from the worktable 22. The X-axis, Y-axis, and Z-axis servomotors 232, 242, 252 need to provide a large power output to move the sliding seat 24, the post 25, the spindle seat 26, and the cutter-storing bin 27. Such heavy loads result in waste of energy, and reduces the service life of the X-axis, Y-axis, and Z-axis servomotors 232, 242, 252. Furthermore, it is difficult to move these loads accurately to a predetermined position.

Again referring to FIG. 1, the machine tool 10 further includes a counterweight 17 and a chain unit 18. The counterweight 17 is connected to the spindle seat 15 by means of the chain unit 18 such that the spindle seat 15 and the counterweight 17 move vertically in opposite directions. The use of such a configuration, however, to control vertical positioning of the spindle seat 15 may result in difficulties with respect to stopping the spindle seat 15 in a predetermined position, particularly since the inertia of the spindle seat 15 makes positioning control difficult with this structure.

SUMMARY OF THE INVENTION

The object of this invention is to provide a CNC machine tool that can overcome the above-mentioned drawbacks associated with the prior art.

According to this invention, a machine tool includes a base having a front portion and a rear portion, and a rotatable worktable including a vertical rotating shaft journalled on the front portion of the base, and a horizontal support plate disposed fixedly on an upper end of the rotating shaft. The support plate has opposite front and rear mounting portions each adapted for mounting a workpiece thereon. The rotating shaft is rotatable so as to exchange positions of the workpieces relative to the base. A support post unit includes a post member disposed fixedly on the rear portion of the base, two vertical Z-axis sliding rails disposed fixedly on the post member and parallel to each other, a vertical first threaded rod journalled in a middle portion of the post member, and a first driving member for driving the first threaded rod to rotate in the post member. A first horizontal rail unit includes a first sliding seat driven by the first threaded rod to move along the Z-axis sliding rails, two horizontal X-axis sliding rails disposed fixedly on the first sliding seat and parallel to each other, a second threaded rod journalled on a middle portion of the first sliding seat, and a second driving member for driving the second threaded rod to rotate on the first sliding seat. A second horizontal rail unit includes a second sliding seat driven by the second threaded rod to move along the X-axis sliding rails, two horizontal Y-axis sliding rails disposed fixedly on the second sliding seat and parallel to each other, a third threaded rod journalled on a middle portion of the second sliding seat, and a third driving member for driving the third threaded rod to rotate on the second sliding seat. The Y-axis sliding rails are perpendicular to the X-axis sliding rails. A spindle head unit includes a spindle seat driven by the third threaded rod to move along the Y-axis sliding rails, and a driving motor disposed on an upper end of the spindle seat. Since the post member is fixed on the base, it is not necessary to move the post member relative to the base. Therefore, the total load of the first, second, and third driving members is reduced.

Preferably, the support post unit further includes a mounting member disposed fixedly on a side of the post member and formed with a vertical slide slot, and a cutter-storing bin disposed on the mounting member. The first sliding seat has an end received slidably within the slide slot in the mounting member. Since the cutter-storing bin is attached to the post member, it is also unnecessary to move the cutter-storing bin relative to the base. The support post unit further includes a counterweight. The first threaded rod has a left-hand threaded portion and a right-hand threaded portion. The first sliding seat is mounted threadably on one of the left-hand and right-hand threaded portions of the first threaded rod. The counterweight is mounted threadably on the other one of the left-hand and right-hand threaded portions of the first threaded rod so that the first sliding seat and the counterweight move in opposite directions when the first threaded rod rotates on the post member. As such, the first sliding seat can be moved accurately to a predetermined position.

BRIEF DESCRIPTION OF THE DRAWINGS

These and other features and advantages of this invention will become apparent in the following detailed description of a preferred embodiment of this invention, with reference to the accompanying drawings, in which.

DETAILED DESCRIPTION OF THE PREFERRED EMBODIMENT

Referring to FIGS. 3 to 6, the preferred embodiment of a CNC machine tool according to this invention includes a base 30, a rotatable worktable 40, a support post unit 50, a first horizontal rail unit 60, a second horizontal rail unit 70, and a spindle head unit 80.

The base 30 has a generally rectangular top surface 31.

The worktable 40 includes a fixed seat 41 disposed fixedly on a front portion of the base 30, a vertical rotating shaft 42 journalled on the fixed seat 41, and a generally rectangular horizontal support plate 43 disposed fixedly on an upper end of the rotating shaft 42. The support plate 43 has opposite front and rear mounting portions 432, 431 each adapted for mounting a workpiece (not shown) thereon. The rotating shaft 42 is rotatable so as to exchange the positions of the workpieces relative to the base 30.

The support post unit 50 includes a post member 51, two vertical Z-axis sliding rails 52, a first threaded rod 53, a first driving member 54, a mounting member 55, a cutter-storing bin 56, and a counterweight 57. The post member 51 is rectangular, and is disposed fixedly on a rear portion of the base 30. The Z-axis sliding rails 52 are disposed respectively and fixedly on left and right sides of a front end of the post member 51, and are parallel to each other. The first threaded rod 53 is journalled in a middle portion of the post member 51, and has a left-hand threaded portion 531 and a right-hand threaded portion 532. The first driving member 54 is configured as a servomotor, and is disposed on an upper end of the post member 51 for rotating the first threaded rod 53 in the post member 51. The mounting member 55 is disposed fixedly on a side of the post member 51, and is formed with a vertical slide slot 551. The cutter-storing bin 56 is disposed on the mounting member 55, and includes a cutter-receiving wheel 561, a clamping unit, and a cutter-changing arm 563. The counterweight 57 is provided with a fixed nut 571 engaging the right-hand threaded portion 532.

The first horizontal rail unit 60 includes a first sliding seat 61, two horizontal X-axis sliding rails 62, a second threaded rod 63, and a second driving member 64. The first sliding seat 61 bridges the Z-axis sliding rails 52, and is provided with a fixed nut 611 engaging the left-hand threaded portion 531 of the first threaded rod 53. As such, the first sliding seat 61 can be driven by the first threaded rod 53 to move on the Z-axis sliding rails 52 along a vertical direction (Z). Since the first sliding seat 61 and the counterweight 57 are mounted respectively and threadably on the left-hand and right-hand threaded portions 531, 532 of the first threaded rod 53, they move in opposite directions when the first threaded rod 53 rotates. An end of the first sliding seat 61 is received slidably within the slide slot 551 in the mounting member 55 of the support post unit 50. The X-axis sliding rails 62 are disposed fixedly on the first sliding seat 61, and are parallel to each other. The second threaded rod 63 is journalled on a middle portion of the first sliding seat 61. The second driving member 64 is configured as a servomotor, and is disposed on an end of the first sliding seat 61 for rotating the second threaded rod 63 on the first sliding seat 61.

The second horizontal rail unit 70 includes a second sliding seat 71 driven by the second threaded rod 63 to move on the X-axis sliding rails 62 along a first horizontal direction (X), two horizontal Y-axis sliding rails 72 disposed fixedly on the second sliding seat 71 and parallel to each other, a third threaded rod 73 journalled on a middle portion of the second sliding seat 71, and a third driving member 74 for driving the third threaded rod 73 to rotate on the second sliding seat 71. The Y-axis sliding rails 72 are perpendicular to the X-axis sliding rails 62. In this embodiment, the second sliding seat 71 is generally L-shaped, and has a base plate portion 711 bridging and movable on the X-axis sliding rails 62 of the first horizontal rail unit 60, and a sliding rail portion 712 extending perpendicularly from an end of the base plate portion 711. The Y-axis sliding rails 72, the third threaded rod 73, and the third driving member 74 are disposed on the sliding rail portion 712. The third driving member 74 is configured as a servomotor.

The spindle head unit 80 includes a spindle seat 81 adapted for mounting a cutter (not shown) and driven by the threaded rod 73 to move on the Y-axis sliding rails 72 along a second horizontal direction (Y) perpendicular to the first horizontal direction (X), and a driving motor 82 disposed on an upper end of the spindle seat 81.

Figure 7:
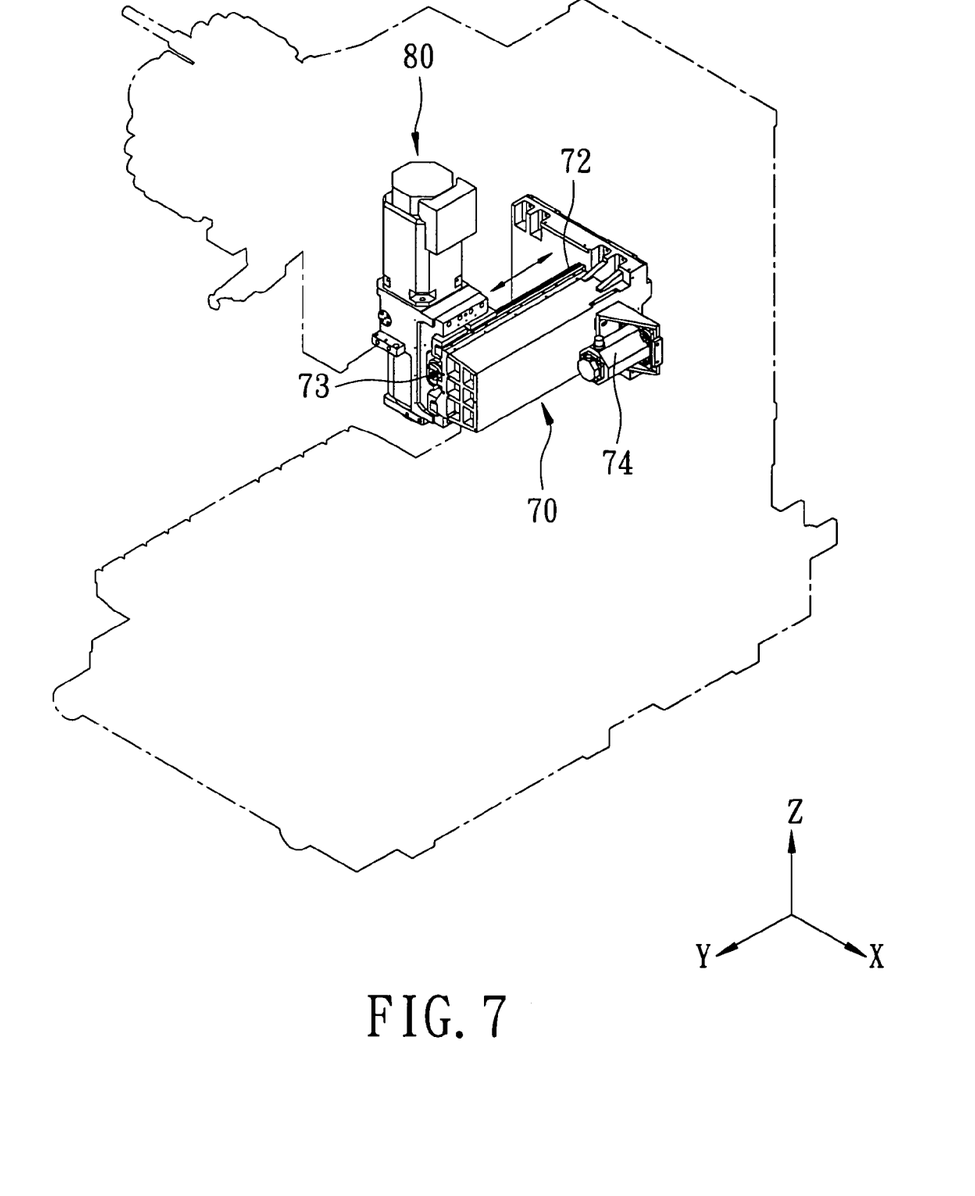
FIG. 7 is a fragmentary schematic perspective view of the preferred embodiment, illustrating how a spindle head unit is moved by a third driving member to move on a second horizontal rail unit.

With additional reference to FIG. 7, when the third driving member 74 is driven, only the spindle head unit 80 moves on the second horizontal rail unit 70 along the second horizontal direction (Y).

Figure 8:
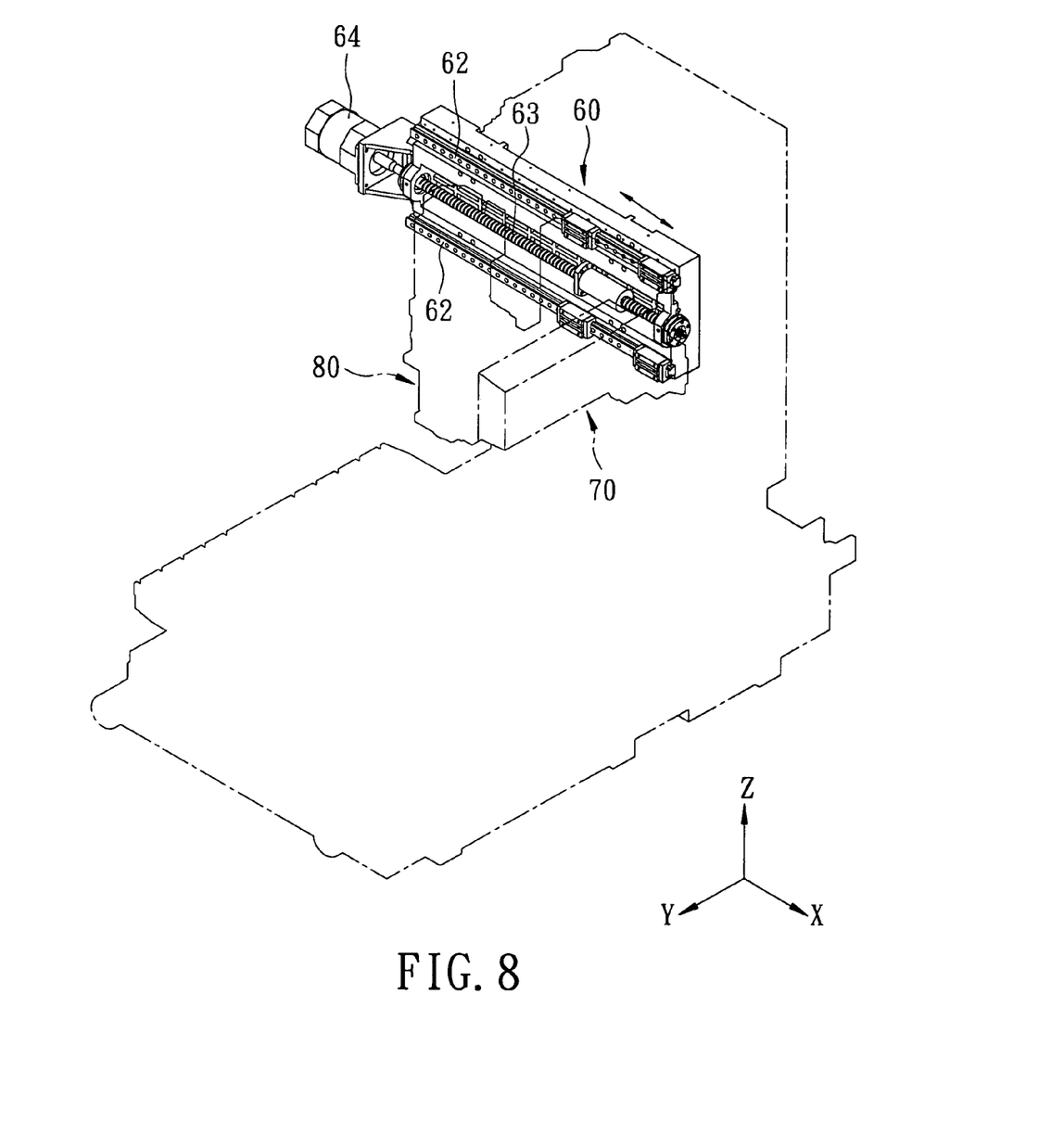
FIG. 8 is a fragmentary schematic perspective view of the preferred embodiment, illustrating how the second horizontal rail unit is driven by a second driving member to move on a first horizontal rail unit.

With additional reference to FIG. 8, when the second driving member 64 is driven, only the second horizontal rail unit 70 moves on the first horizontal rail unit 60 along the first horizontal direction (X).

Figure 9:
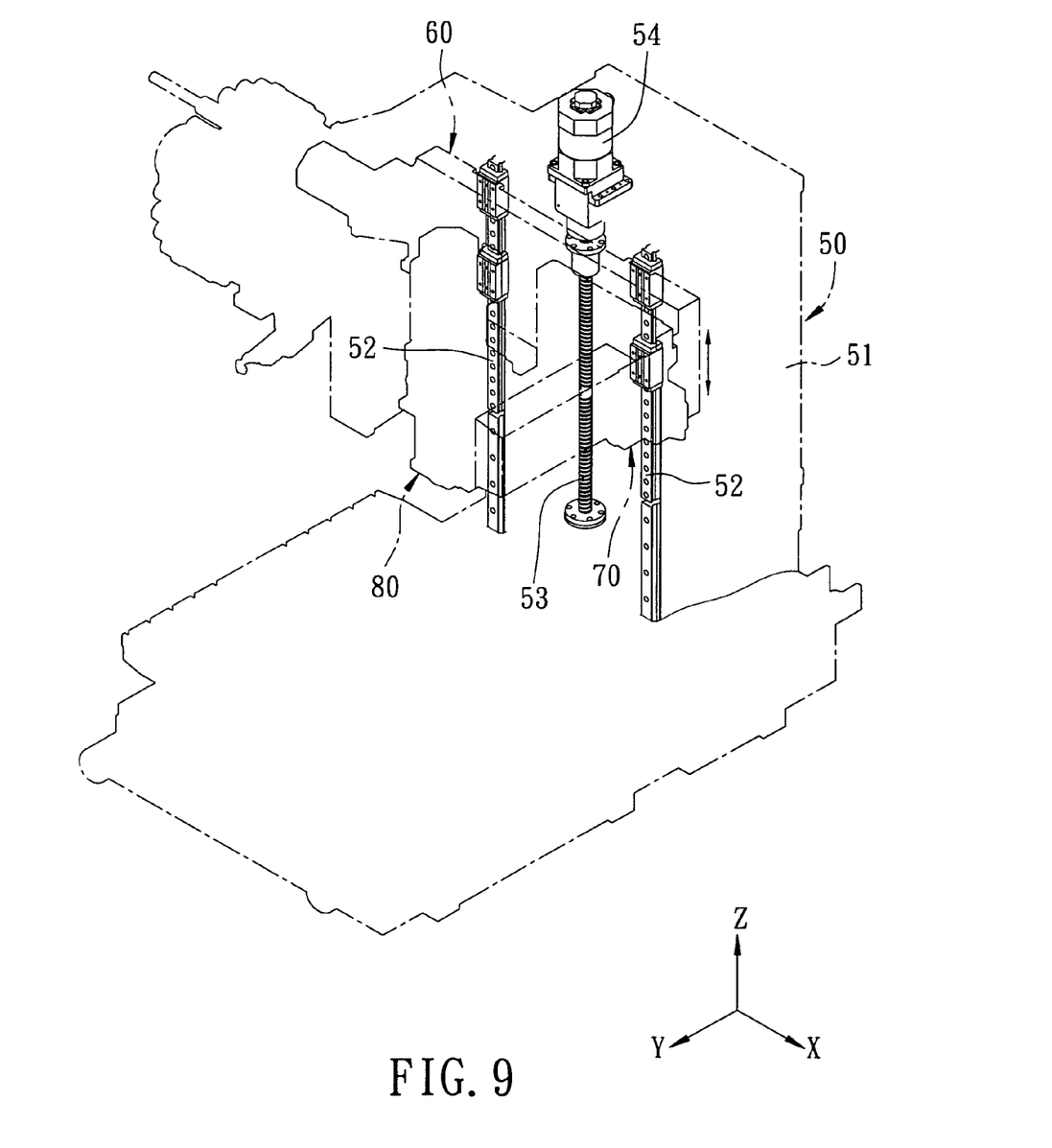
FIG. 9 is a fragmentary schematic perspective view of the preferred embodiment, illustrating how the first horizontal rail unit is driven by a first driving member to move on a support post unit.

With additional reference to FIG. 9, when the first driving member 54 is driven, only the first horizontal unit 60 moves on the support post unit 50 along the vertical direction (Z).

Since it is not necessary to move the post member 51 and the cutter-storing bin 56 during operation, the total power output of the first, second, and third driving members 54, 64, 74 can be reduced significantly. This increases the service life of the machine tool.

Figure 10:
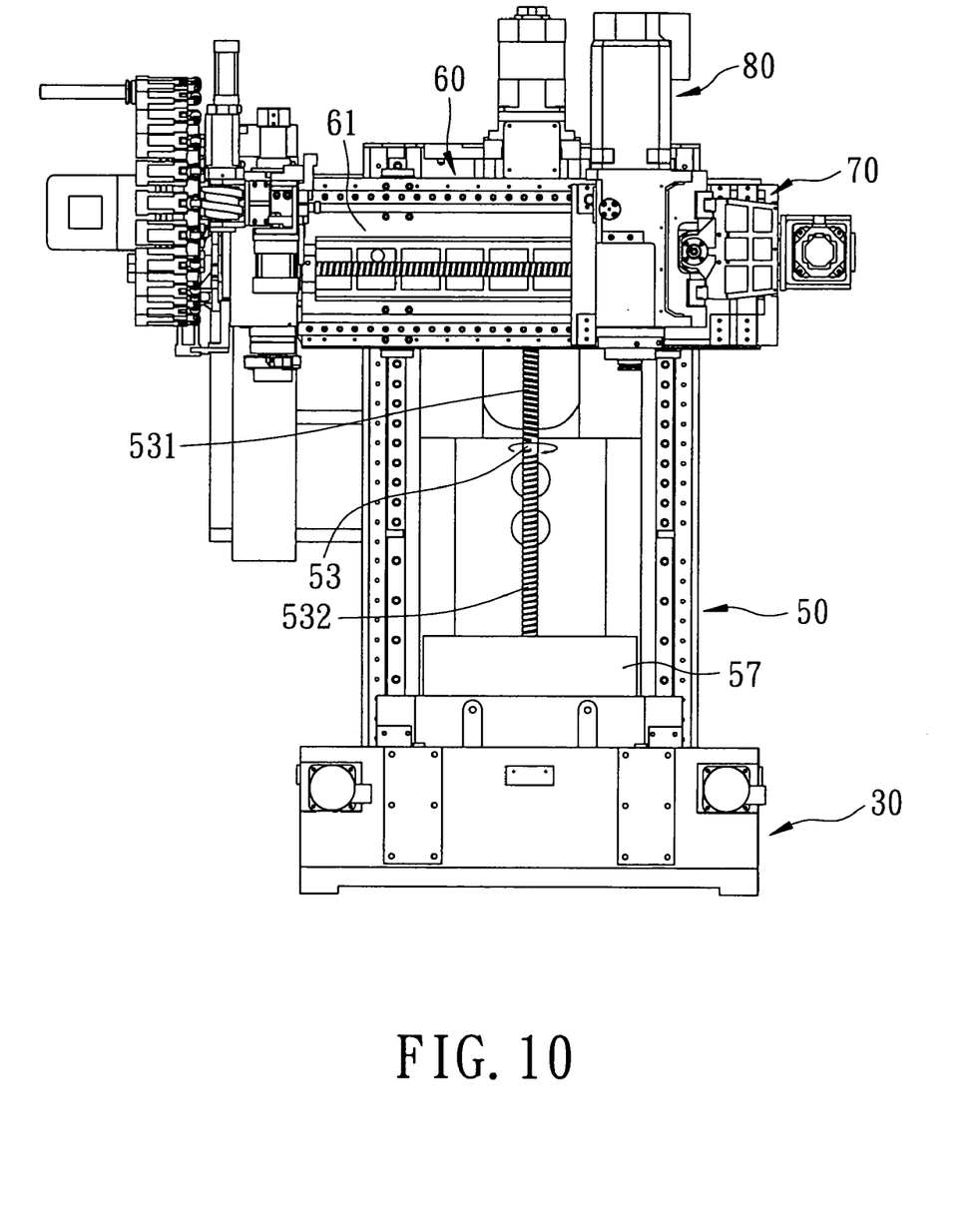
FIG. 10 is a front side view of the preferred embodiment, illustrating how a first sliding seat and a counterweight are mounted respectively and threadably on left-hand and right-hand threaded portions of the first threaded rod.
Figure 11:
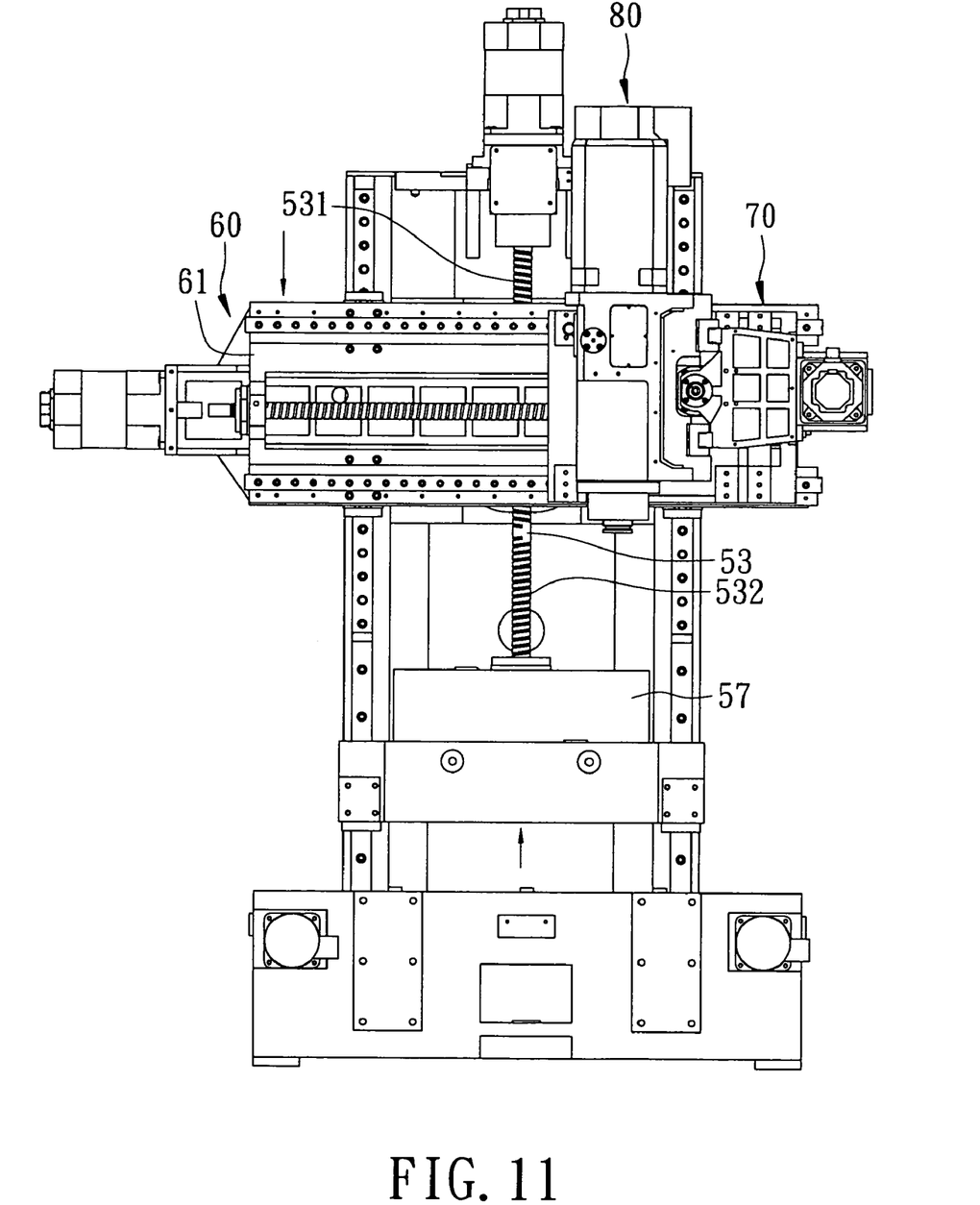
FIG. 11 is a front side view of the preferred embodiment, illustrating the first sliding seat and the counterweight in a state moved toward each other from the positions of FIG. 10.

Referring to FIG. 10, when the first horizontal rail unit 60 is disposed in its upper limit position, the counterweight 57 is disposed in its lower limit position. In this state, when the first threaded rod 53 rotates in a direction, such as that indicated in FIG. 10, the first horizontal rail unit 60 and the counterweight 57 move toward each other, as shown in FIG. 11. Since the first threaded rod 53 is rigid and is connected threadably to the first sliding seat 61, the first horizontal rail unit 60 can be moved smoothly and accurately to a predetermined position so as to improve machining precision.

With this invention thus explained, it is apparent that numerous modifications and variations can be made without departing from the scope and spirit of this invention. It is therefore intended that this invention be limited only as indicated by the appended claims.

I claim:

1. A machine tool including:
    a base having a front portion and a rear portion;
    a worktable unit on said front portion of said base adapted for mounting a workpiece thereon;
    a support post unit including a post member disposed fixedly on said rear portion of said base, two vertical Z-axis sliding rails disposed fixedly on said post member and parallel to each other, a vertical first threaded rod journalled in a middle portion of said post member, a first driving member for driving said first threaded rod to rotate in said post member, and a counterweight, said first threaded rod having a first threaded portion of a first hand thread and a second threaded portion of an opposite hand thread;
    a first horizontal rail unit including a first sliding seat driven by said first threaded rod to move along said Z-axis sliding rails, two horizontal X-axis sliding rails disposed fixedly on said first sliding seat and parallel to each other, a second threaded rod journalled on a middle portion of said first sliding seat, and a second driving member for driving said second threaded rod to rotate on said first sliding seat;
    a second horizontal rail unit including a second sliding seat driven by said second threaded rod to move along said X-axis sliding rails, two horizontal Y-axis sliding rails disposed fixedly on said second sliding seat and parallel to each other, a third threaded rod journalled on a middle portion of said second sliding seat, and a third driving member for driving said third threaded rod to rotate on said second sliding seat, said Y-axis sliding rails being perpendicular to said X-axis sliding rails; and
    a spindle head unit including a spindle seat driven by said third threaded rod to move along said Y-axis sliding rails, and a driving motor disposed on an upper end of said spindle seat;
    and wherein said first sliding seat is mounted threadedly on one of said first and second threaded portions, and wherein said counterweight is mounted on the other of said first and second threaded portions.

2. The machine tool as claimed in claim 1, wherein said support post unit further includes:
    a mounting member disposed fixedly on a side of said post member and formed with a vertical slide slot, said first sliding seat having an end received slidably within said slide slot in said mounting member; and
    a cutter-storing bin disposed on said mounting member.

3. The machine tool as claimed in claim 1, wherein said first threaded portion is a left-hand threaded portion and said second threaded portion is a right-hand threaded portion, and wherein the arrangement of the first sliding seat and the counterweight on the first and second threaded portions are such that said first sliding seat and said counterweight move in opposite directions when said first threaded rod rotates on said post member.

4. The machine tool as claimed in claim 1, wherein said second sliding seat is generally L-shaped, and has a base plate portion bridging and movable on said X-axis sliding rails of said first horizontal rail unit, and a sliding rail portion extending perpendicularly from an end of said base plate portion, said Y-axis sliding rails being disposed fixedly on said sliding rail portion of said second sliding seat.

5. The machine tool as claimed in claim 1, wherein said worktable unit includes a vertical rotating shaft journalled on said front portion of said base, and a horizontal support plate disposed fixedly on an upper end of said rotating shaft, said support plate having opposite front and rear mounting portions each adapted for mounting a workpiece thereon, said rotating shaft being rotatable so as to exchange positions of the workpieces relative to said base.

* * * * *